United States Patent
Ise et al.

(10) Patent No.: US 9,421,893 B2
(45) Date of Patent: Aug. 23, 2016

(54) VEHICLE HEATING DEVICE AND HEATER-EQUIPPED VEHICLE SEAT

(71) Applicant: Panasonic Intellectual Property Management Co., Ltd., Osaka-shi, Osaka (JP)

(72) Inventors: Takehiko Ise, Osaka (JP); Yoshiaki Kurosawa, Osaka (JP); Atsunori Hashimoto, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 5 days.

(21) Appl. No.: 14/395,715

(22) PCT Filed: Dec. 3, 2013

(86) PCT No.: PCT/JP2013/007082
§ 371 (c)(1),
(2) Date: Oct. 20, 2014

(87) PCT Pub. No.: WO2014/115212
PCT Pub. Date: Jul. 31, 2014

(65) Prior Publication Data
US 2015/0084384 A1 Mar. 26, 2015

(30) Foreign Application Priority Data
Jan. 23, 2013 (JP) ................................ 2013-010553

(51) Int. Cl.
*A47C 31/00* (2006.01)
*B60N 2/56* (2006.01)
*B60N 2/44* (2006.01)

(52) U.S. Cl.
CPC ............ *B60N 2/5657* (2013.01); *B60N 2/4495* (2013.01); *B60N 2/5635* (2013.01); *B60N 2/5678* (2013.01); *B60N 2/5685* (2013.01)

(58) Field of Classification Search
CPC .. B60N 2/5657; B60N 2/4495; B60N 2/5635; B60N 2/5678; B60N 2/5685

USPC ......................................... 297/180.11–180.14
See application file for complete search history.

(56) References Cited

U.S. PATENT DOCUMENTS

| | | | | |
|---|---|---|---|---|
| 5,382,075 | A | * | 1/1995 | Shih .......................... A47C 7/74 297/180.11 |
| 5,403,065 | A | * | 4/1995 | Callerio ................... B64G 6/00 297/180.11 |

(Continued)

FOREIGN PATENT DOCUMENTS

| | | |
|---|---|---|
| CN | 1062831 | 7/1992 |
| CN | 102669975 | 9/2012 |

(Continued)

OTHER PUBLICATIONS

Search Report issued in corresponding Chinese Patent Application, Jun. 3, 2016, 4 pages with translation.

*Primary Examiner* — Laurie K Cranmer
(74) *Attorney, Agent, or Firm* — Hamre, Schumann, Mueller & Larson, P.C.

(57) ABSTRACT

A vehicle heating apparatus (100A) of the present disclosure is a heating apparatus to be mounted on a vehicle seat (11) at a position below a sitting portion (S) of the vehicle seat (11). The vehicle heating apparatus (100A) includes: a housing (10) having an intake port (2), a blowing port (3), and an internal space (4) serving as a flow path of air from the intake port (2) to the blowing port (3); a fan (6) provided in the internal space (4); a heater (7) provided in the internal space (4); and a mounting structure (8) adapted to mount the housing (10) to the vehicle seat (11) in such a manner that the housing (10) is movable in a width direction of the vehicle seat (11). Therefore, the vehicle heating apparatus (100A) of the present disclosure is highly convenient for occupants.

11 Claims, 14 Drawing Sheets

(56) References Cited

U.S. PATENT DOCUMENTS

| | | | | |
|---|---|---|---|---|
| 5,692,952 | A * | 12/1997 | Chih-Hung | B60H 1/00285 297/180.11 |
| 7,070,231 | B1 * | 7/2006 | Wong | A47C 7/74 297/180.1 |
| 7,370,911 | B2 * | 5/2008 | Bajic | B60N 2/5635 297/180.11 |
| 8,123,290 | B1 * | 2/2012 | Aiken | A47C 7/744 297/180.1 |
| 8,167,368 | B2 * | 5/2012 | Eckel | B60H 1/00285 297/180.13 |
| 2003/0132650 | A1 * | 7/2003 | Bargheer | B60N 2/48 297/180.13 |
| 2008/0073947 | A1 * | 3/2008 | Hagler-Gray | B60H 1/00264 297/180.14 |
| 2011/0133524 | A1 * | 6/2011 | Cheng | A47C 7/402 297/180.11 |

FOREIGN PATENT DOCUMENTS

| | | | |
|---|---|---|---|
| GB | 2137873 A * | 10/1984 | A47C 7/748 |
| JP | 2011-254882 | 12/2011 | |
| JP | 2012-183154 | 9/2012 | |

* cited by examiner

VEHICLE HEATING DEVICE AND HEATER-EQUIPPED VEHICLE SEAT

TECHNICAL FIELD

The present invention relates to a vehicle heating apparatus to be attached to vehicle seats. The present invention also relates to a heater-equipped vehicle seat including the vehicle heating apparatus.

BACKGROUND ART

As seats for vehicles such as wheeled vehicles, heater-equipped vehicle seats capable of supplying warm air to the lower legs of occupants have been conventionally proposed.

Patent Literature 1 discloses a heater-equipped vehicle seat 200 in which an air conditioner 210 is disposed within a seat cushion 211B as shown in FIG. 12. The air conditioner 210 has an intake port 202, an intake duct 204A, an air blower 206, a pair of discharge ducts 204B, a pair of heaters 207, and a pair of discharge ports 203. The heater 207 is disposed within each of the pair of discharge ducts 204B. The intake port 202 and the pair of discharge ports 203 open in a forward direction with respect to the heater-equipped vehicle seat 200, and are arranged side by side in a horizontal direction. In addition, the discharge port 203 is provided with a fin 203A for causing air discharged from the discharge port 203 to be directed downward.

Patent Literature 2 discloses a heater-equipped vehicle seat 300 including, as shown in FIG. 13, a seat cushion 311B, a leg rest member 308, an air blower 306, and a duct 304. A portion of the duct 304 is formed in the leg rest member 308. Warm air delivered from the air blower 306 is supplied toward the lower legs of an occupant through the duct 304. The leg rest member 308 is configured to move back and forth in response to the back-and-forth movement of the legs of the occupant.

CITATION LIST

Patent Literature

Patent Literature 1: JP 2011-254882 A
Patent Literature 2: JP 2012-183154 A

SUMMARY OF INVENTION

Technical Problem

The heater-equipped vehicle seats described in Patent Literature 1 and Patent Literature 2 have room for further performance improvement in terms of convenience for occupants. In view of this, the present invention aims to provide a vehicle heating apparatus and a heater-equipped vehicle seat that are highly convenient for occupants.

Solution to Problem

The present disclosure provides a vehicle heating apparatus to be mounted on a vehicle seat at a position below a sitting portion of the vehicle seat, the vehicle heating apparatus including:
a housing having an intake port, a blowing port, and an internal space serving as a flow path of air from the intake port to the blowing port;
a fan provided in the internal space;
a heater provided in the internal space; and
a mounting structure adapted to mount the housing to the vehicle seat in such a manner that the housing is movable in a width direction of the vehicle seat.

Advantageous Effects of Invention

With the features of the above vehicle heating apparatus, a vehicle heating apparatus highly convenient for the occupant can be provided.

DESCRIPTION OF EMBODIMENTS

Figure 1:
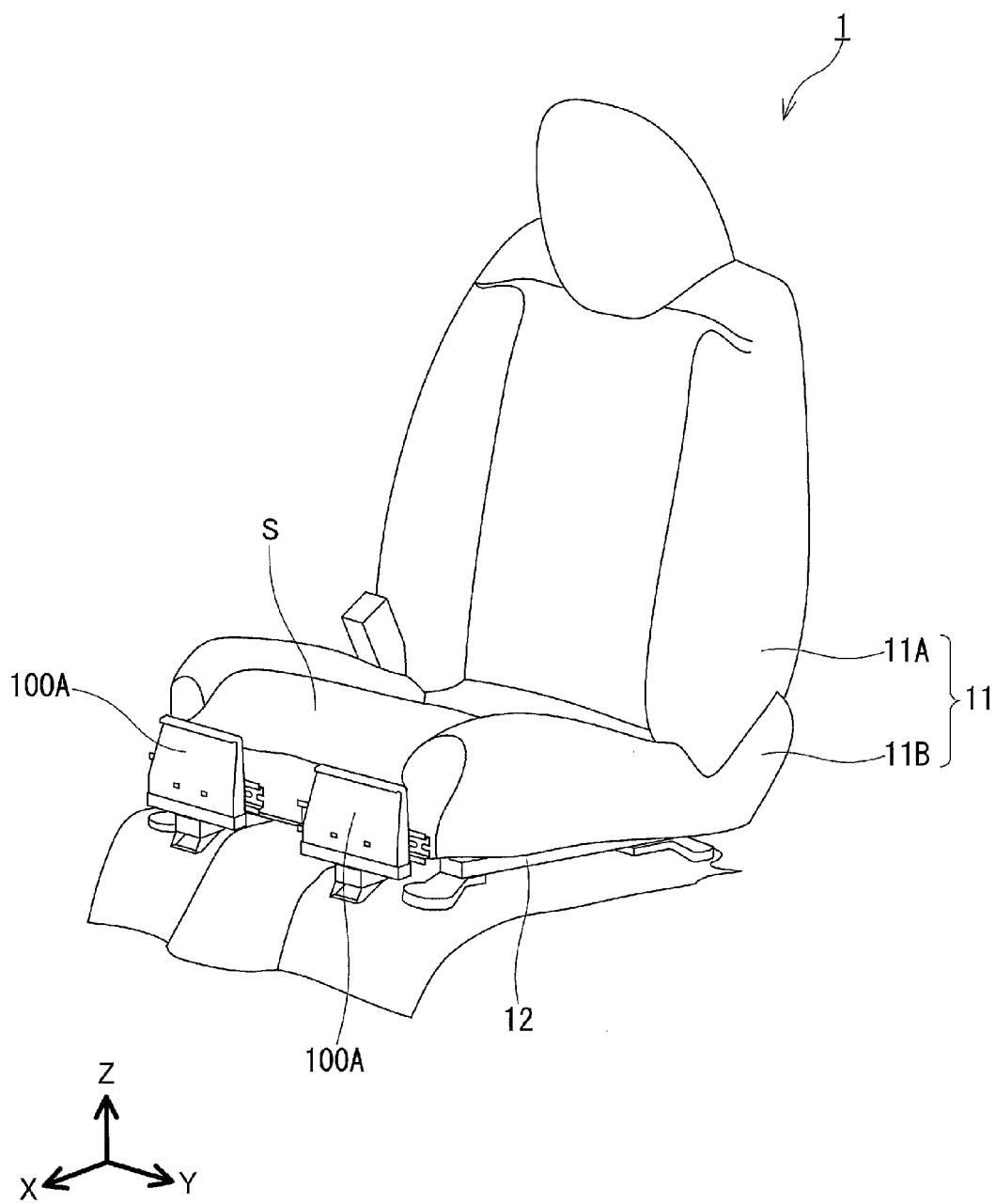
FIG. 1 is a perspective view of a heater-equipped vehicle seat according to a first embodiment of the present disclosure.

In the heater-equipped vehicle seat 200 of Patent Literature 1, the positions of the discharge ports 203 in the width direction of the heater-equipped vehicle seat 200 are fixed at particular positions. In order to, for example, increase the warmth for an occupant, the occupant may desire to adjust the positions of the discharge ports 203 in the width direction in accordance with the bodily characteristics of the occupant or the sitting posture of the occupant. However, in the heater-equipped vehicle seat 200 of Patent Literature 1, the positions of the discharge ports 203 in the width direction cannot be adjusted.

In the heater-equipped vehicle seat 300 of Patent Literature 2, the leg rest member 308 moves in a back-and-forth direction in response to the movement of the legs of the occupant; however, the leg rest member 308 does not move in the width direction of the heater-equipped vehicle seat 300.

A first aspect of the present disclosure provides a vehicle heating apparatus to be mounted on a vehicle seat at a position below a sitting portion of the vehicle seat, the vehicle heating apparatus including:

a housing having an intake port, a blowing port, and an internal space serving as a flow path of air from the intake port to the blowing port;

a fan provided in the internal space;

a heater provided in the internal space; and a mounting structure adapted to mount the housing to the vehicle seat in such a manner that the housing is movable in a width direction of the vehicle seat.

According to the first aspect, the housing of the vehicle heating apparatus can be mounted to a vehicle seat by the mounting structure in such a manner that the housing is movable in a width direction of the vehicle seat. The occupant can move the housing of the vehicle heating apparatus to an appropriate position in the width direction of the vehicle seat in accordance with the bodily characteristics of the occupant, the sitting posture of the occupant, etc. Therefore, the convenience for the occupant is high.

A second aspect of the present disclosure provides the vehicle heating apparatus as set forth in the first aspect, wherein, in a usage state where the vehicle heating apparatus is mounted on the vehicle seat, the blowing port is located above the intake port and opens downwardly relative to a horizontal direction. According to the second aspect, the intake port is located below the blowing port. Furthermore, the blowing port opens downwardly relative to the horizontal direction. Therefore, warm air blown out through the blowing port forms a circulating flow below the leg of the occupant and thus is highly likely to reach the intake port. Therefore, the temperature of air drawn into the intake port can be increased, and the amount of heating required for the heater can be reduced.

A third aspect of the present disclosure provides the vehicle heating apparatus as set forth in the first aspect or the second aspect, wherein the flow path of air has a narrowing flow path having a flow path cross-sectional area that decreases from an upstream side toward a downstream side in a flow direction of air. According to the third aspect, the flow velocity of the air flow toward the downstream side can be increased.

A fourth aspect of the present disclosure provides the vehicle heating apparatus as set forth in any one of the first to third aspects, wherein the mounting structure has an engaging portion that engages with a support structure fixed to the vehicle seat. According to the fourth aspect, the housing can be mounted to the vehicle seat by engagement of the engaging portion with the support structure.

A fifth aspect of the present disclosure provides the vehicle heating apparatus as set forth in the fourth aspect, wherein the support structure has a rail fixed to the vehicle seat so as to extend in the width direction, and the engaging portion engages with the rail in such a manner that the housing is movable along the rail in the width direction. According to the fifth aspect, the housing can be moved along the rail. Therefore, the position of the vehicle heating apparatus in the width direction can be minutely adjusted.

A sixth aspect of the present disclosure provides the vehicle heating apparatus as set forth in the fifth aspect, wherein, in a usage state where the vehicle heating apparatus is mounted on the vehicle seat, the engaging portion engages with an upper end portion of the rail and a lower end portion of the rail. According to the sixth aspect, since the engaging portion engages with the upper end portion of the rail or the lower end portion of the rail, the posture of the housing is stable when the engaging portion is in engagement with the rail.

A seventh aspect of the present disclosure provides the vehicle heating apparatus as set forth in the fifth aspect or the sixth aspect, further including a locking mechanism provided at an end in the width direction of the housing, wherein the locking mechanism includes: a locking portion that restrains movement of the housing in the width direction by being in contact with the rail in a usage state where the vehicle heating apparatus is mounted on the vehicle seat; and a lever operative to disengage the locking portion from the rail. According to the seventh aspect, the housing of the vehicle heating apparatus can be made movable along the rail by using the lever to disengage the locking portion from the rail. In addition, the movement of the housing of the vehicle heating apparatus in the width direction can be restrained by the locking portion being in contact with the rail.

An eighth aspect of the present disclosure provides a heater-equipped vehicle seat including:

a vehicle seat having a sitting portion; and the vehicle heating apparatus according to any one of the first to seventh aspects that is mounted on the vehicle seat at a position below the sitting portion so as to be movable in a width direction of the vehicle seat.

A ninth aspect of the present disclosure provides the heater-equipped vehicle seat as set forth in the eighth aspect, wherein a pair of the vehicle heating apparatuses are mounted on the vehicle seat at a distance from each other in the width direction. According to the ninth aspect, the occupant can adjust the positions of the vehicle heating apparatuses in the width direction in accordance with the positions of the right and left legs of the occupant. Therefore, the convenience for the occupant is further improved.

A tenth aspect of the present disclosure provides the heater-equipped vehicle seat as set forth in the eighth aspect or the ninth aspect, further including a support structure fixed to the vehicle seat and supporting the vehicle heating apparatus, wherein the mounting structure of the vehicle heating apparatus has an engaging portion that engages with the support structure. According to the tenth aspect, the vehicle heating apparatus can be mounted to the vehicle seat by engagement of the engaging portion with the support structure.

An eleventh aspect of the present disclosure provides the heater-equipped vehicle seat as set forth in the tenth aspect, wherein the support structure has a left support structure and a right support structure that are fixed to the vehicle seat at a distance from each other in the width direction, and the pair of vehicle heating apparatuses are supported respectively by the left support structure and by the right support structure. According to the eleventh aspect, a space between the left support structure and the right support structure can be effectively used.

A twelfth aspect of the present disclosure provides the heater-equipped vehicle seat as set forth in the eleventh aspect, further including a seat position adjustment bar provided between the left support structure and the right support structure and operative to adjust a position of the vehicle seat in a back-and-forth direction. According to the twelfth aspect, the seat position adjustment bar can be provided by using the space between the left support structure and the right support structure.

A thirteenth aspect of the present disclosure provides the heater-equipped vehicle seat as set forth in any one of the eighth to twelfth aspects, wherein the support structure has a rail fixed to the vehicle seat so as to extend in the width direction, and the engaging portion is in engagement with the rail in such a manner that the housing of the vehicle heating apparatus is movable along the rail in the width direction of the vehicle seat. According to the thirteenth aspect, the housing can be moved along the rail. Therefore, the position of the vehicle heating apparatus in the width direction can be minutely adjusted.

A fourteenth aspect of the present disclosure provides the heater-equipped vehicle seat as set forth in the thirteenth aspect, wherein the engaging portion is in engagement with an upper end portion of the rail and a lower end portion of the rail. According to the fourteenth aspect, since the engaging portion engages with the upper end portion of the rail and the lower end portion of the rail, the posture of the housing is stable when the engaging portion is in engagement with the rail.

A fifteenth aspect of the present disclosure provides the heater-equipped vehicle seat as set forth in the fourteenth aspect, wherein the rail has a middle portion spaced from the housing in a region between the upper end portion and the lower end portion. According to the fifteenth aspect, the middle portion can be used, for example, to fix the rail to the vehicle seat.

Hereinafter, embodiments of the present disclosure will be described with reference to the drawings. The following description relates to examples of the present invention, and the present invention is not limited by these examples. The following description assumes that the vehicle is placed on a horizontal plane.

<First Embodiment>

As shown in FIG. 1, a heater-equipped vehicle seat 1 includes: a vehicle seat 11 having a back cushion 11A and a sitting cushion 11B; and vehicle heating apparatuses 100A. The heater-equipped vehicle seat 1 is attached to a base member 12 provided on a floor of the vehicle. The back cushion 11A supports the back of the occupant. In the sitting cushion 11B is formed a sitting portion S that supports the upper legs of the occupant. The vehicle heating apparatuses 100A are mounted on the vehicle seat 11 at positions below the sitting portion S so as to be movable in the width direction (Y direction) of the vehicle seat. That is, the heater-equipped vehicle seat 1 includes the vehicle seat 11 having the sitting portion S and the vehicle heating apparatuses 100A mounted on the vehicle seat 11 at positions below the sitting portion S. The vehicle heating apparatuses 100A are provided on an end portion of the vehicle seat 11 in the forward direction (the positive direction of the X axis), and mainly supply warm air to the lower legs of the occupant. In the accompanying drawings, the XY plane is horizontal. The forward direction with respect to the heater-equipped vehicle seat 1 is defined as the positive direction of the X axis. The width direction of the heater-equipped vehicle seat 1 is defined as the Y direction, and the direction from the right leg of the occupant toward the left leg of the occupant is defined as the positive direction of the Y axis. The vertical direction perpendicular to the XY plane is defined as the Z direction, and the vertically upward direction is defined as the positive direction of the Z axis. In the present description, "left" and "right" are determined with respect to the occupant seated on the heater-equipped vehicle seat 1.

Figure 2:
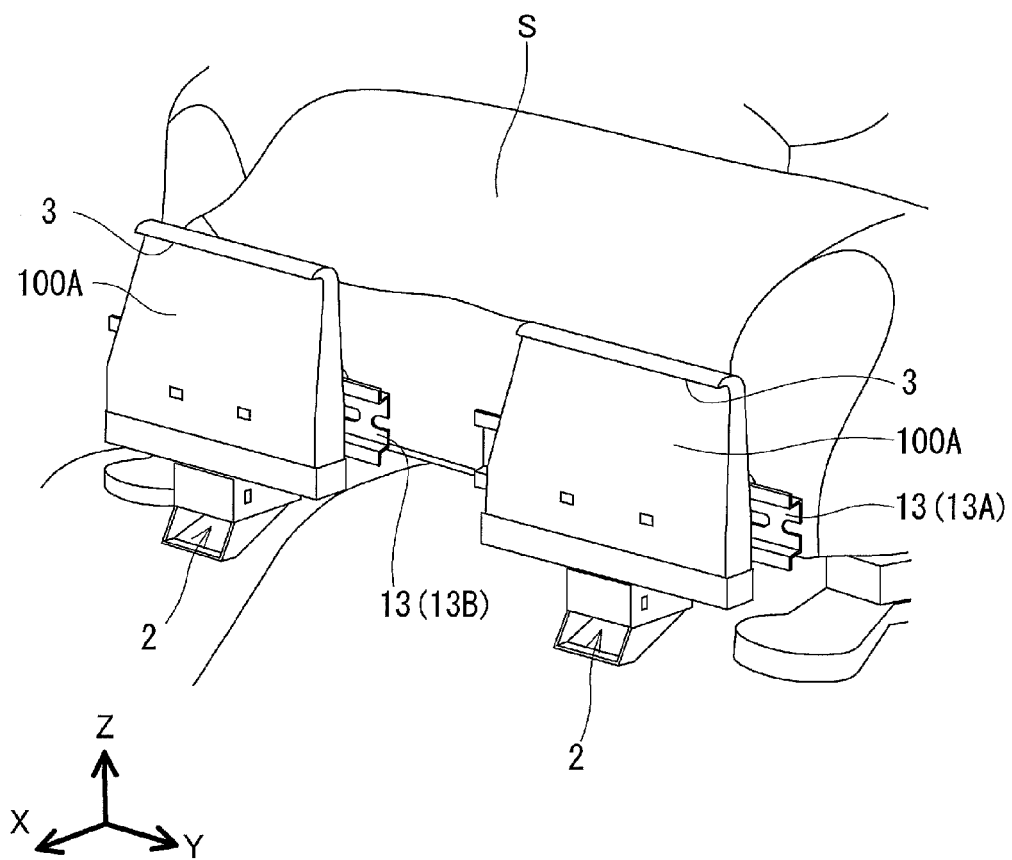
FIG. 2 is an enlarged view of a major portion of the heater-equipped vehicle seat of FIG. 1.
Figure 4:
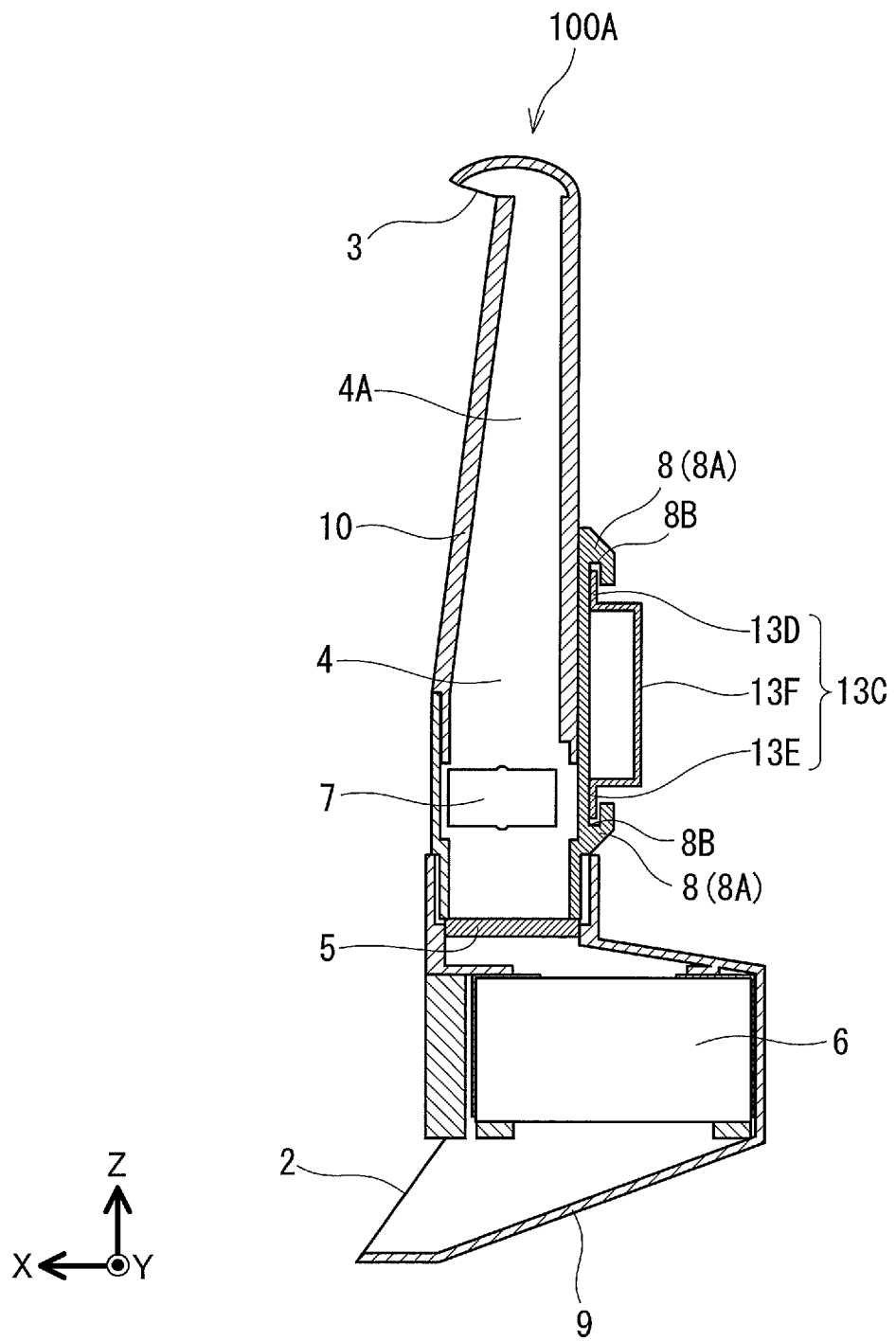
FIG. 4 is a cross-sectional view taken along the IV-IV line of FIG. 3.

As described above, the vehicle heating apparatus 100A is a heating apparatus to be mounted on the vehicle seat at a position below the sitting portion S of the vehicle seat 11. As shown in FIG. 2, the heater-equipped vehicle seat 1 further has a support structure 13 fixed to the vehicle seat 11. The support structure 13 supports the vehicle heating apparatus 100A. As shown in FIG. 4, the vehicle heating apparatus 100A includes a housing 10, a fan 6, a heater 7, and a mounting structure 8. The housing 10 has an intake port 2, a blowing port 3, and an internal space 4 serving as a flow path of air from the intake port 2 to the blowing port 3. The fan 6 is provided in the internal space 4. The heater 7 is also provided in the internal space 4. The mounting structure 8 is a structure for mounting the housing 10 to the vehicle seat 11 in such a manner that the housing 10 is movable in the width direction (Y direction) of the vehicle seat 11.

Figure 5:
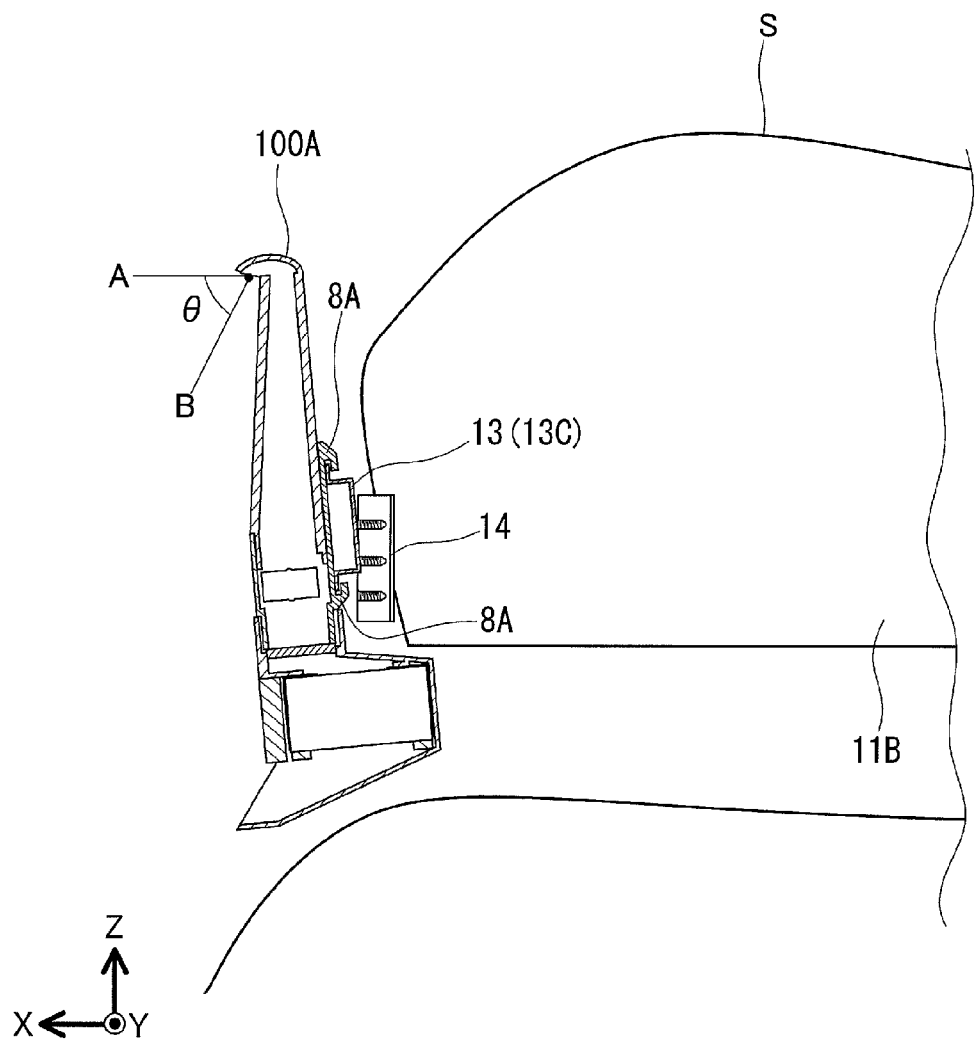
FIG. 5 is a cross-sectional view showing a mounted state of the vehicle heating apparatus according to the first embodiment.

As shown in FIG. 5, the blowing port 3 is located above the intake port 2 and opens downwardly relative to the horizontal direction in a state (referred to as a "usage state" hereinafter) where the vehicle heating apparatus 100A is mounted on the vehicle seat 11. That is, the blowing port 3 opens obliquely downward. In addition, as shown in FIG. 4, the housing 10 has a confining wall 9 that restrains air from being drawn into the intake port 2 from the back or side in the usage state.

In the usage state, the flow path 4 extends upwardly from the intake port 2, turns obliquely downward at the upper end of the housing 10, and extends to the blowing port 3. The housing 10 has a portion bent in a hook shape, in which portion the blowing port 3 is formed. By the action of the fan 6, air around the intake port 2 is drawn through the intake port 2 and supplied to the internal space 4 (flow path). The air delivered upwardly by the fan 6 is heated by the heater 7 when flowing in the flow path 4. The air heated by the heater 7 (warm air) is blown out of the housing 10 through the blowing port 3.

As shown in FIG. 4, the fan 6 is located closer to the intake port 2 than the heater 7. In the present embodiment, the heater 7 is not situated in that portion of the flow path 4 which is upstream of the fan 6. With such a configuration, pressure loss of air flow in the portion of the flow path 4 which is upstream of the fan 6 is reduced; therefore, reduction in the suction power of the fan 6 is prevented. Since the heater 7 is located in that portion of the flow path 4 which is downstream of the fan 6, the length of the flow path 4 between the heater 7 and the blowing port 3 is relatively short. Therefore, heat loss of the air heated by the heater 7 is reduced. Furthermore, since the air blown from the fan 6 certainly passes through the heater 7, it is possible to reduce non-uniformity of flow velocity distribution of the warm air blown out through the blowing port 3.

The vehicle heating apparatus 100A further includes a flow regulating member 5 provided in the internal space 4 at a position closer to the intake port 2 than the fan 6. In the present embodiment, the heater 7 is provided closer to the intake port 2 than the flow regulating member 5. The flow velocity distribution of the flow of air delivered upwardly by the fan 6 is uniformized by the flow regulating member 5. Therefore, the air flow with the flow velocity distribution uniformized by the flow regulating member 5 reaches the heater 7. As a result, the heater 7 can heat the air flow uniformly.

Figure 6:
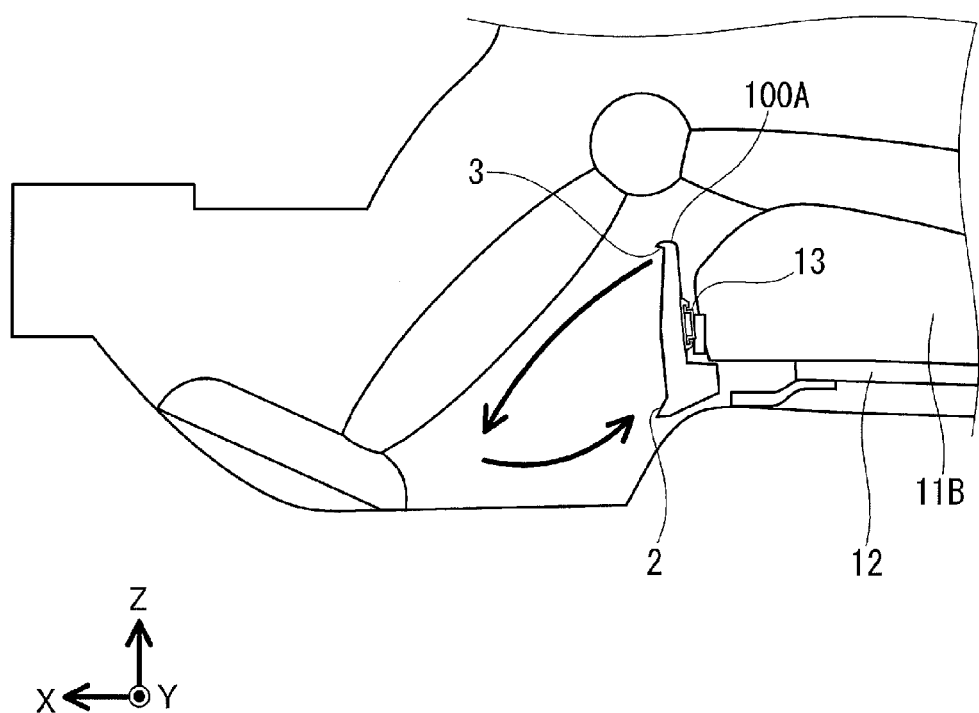
FIG. 6 is a cross-sectional view for illustrating a circulating flow of warm air.

As shown in FIG. 6, warm air blown to the outside thorough the blowing port 3 flows downwardly along the lower leg of the occupant and reaches the floor of the vehicle. The warm air having reached the floor of the vehicle is pushed by the subsequent warm air blown out through the blowing port 3, flows upwardly and backwardly, and reaches the vicinity of the intake port 2. Some of the warm air having reached the vicinity of the intake port 2 is drawn into the intake port 2 and supplied to the flow path inside the housing 10. That is, the warm air blown out through the blowing port 3 forms a circulating flow in the vicinity of the leg of the occupant and thus is highly likely to reach the intake port 2. Therefore, the temperature of the air drawn into the intake port 2 can be increased, and the amount of heating required for the heater 7 can be reduced.

As the fan 6, an axial-flow fan or a centrifugal fan can be used. The amount of air delivered by the fan 6 is not particularly limited. For example, it is recommended that the air flow have a flow velocity of 0.4 to 2.0 m/sec immediately after being driven by the fan 6. If so, the circulating flow of warm air as described above is more likely to be formed. The heater 7 is, for example, an electric heater such as a PTC (Positive Temperature Coefficient) heater or a ceramic heater. In this case, the heater 7 generates heat by receiving electricity supplied from a power supply (omitted from the drawings), and heats the air flowing in the flow path 4. The output power of the heater 7 is not particularly limited, and is, for example, 50 to 300 W. The heater 7 may be a hot-water heater or the like that performs heating using a coolant having exchanged heat with a heat source (e.g., a water-cooled engine) external to the vehicle heating apparatus 100A.

Figure 3:
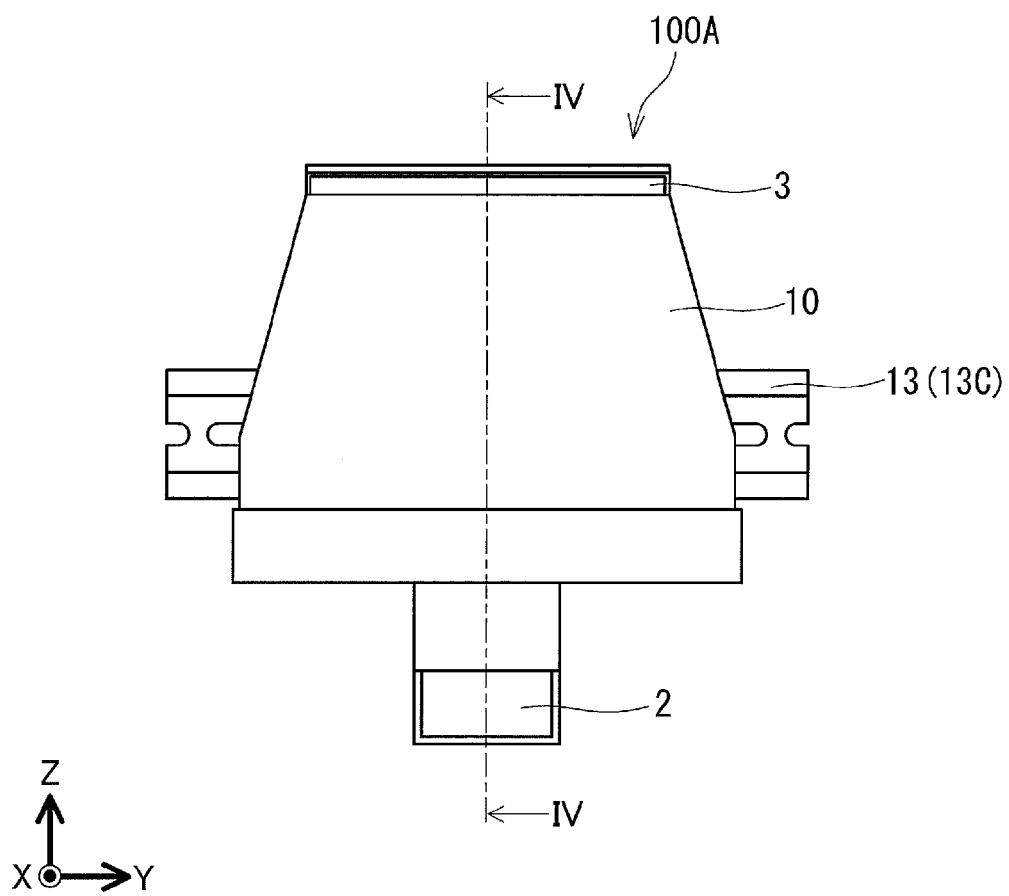
FIG. 3 is a front view of a vehicle heating apparatus according to the first embodiment.

As shown in FIG. 3, in the upper end portion of the housing 10, the blowing port 3 extends continuously in the width direction (Y-axis direction). When the vehicle heating apparatus 100A in the usage state is viewed in plan from the front of the sitting portion S, the positions of the blowing port 3 and the intake port 2 in the width direction (Y-axis direction) coincide with each other. That is, when the intake port 2 is shifted in parallel in the vertical direction (Z-axis direction) in a plan view where the vehicle heating apparatus 100A is viewed in plan from the front of the sitting portion S, the intake port 2 overlaps the blowing port 3. Specifically, the intake port 2 is located directly below the blowing port 3. With such a positional relationship, the intake port 2 is located on the path of the flow of warm air blown out through the blowing port 3; therefore, the warm air blown out through the blowing port 3 is highly likely to reach the intake port 2. Accordingly, the circulation of warm air between the blowing port 3 and the intake port 2 is promoted.

The width of the blowing port 3 is greater than the width of the intake port 2. The ratio of the width W2 of the blowing port 3 to the width W1 of the intake port 2 (W2/W1) is, for example, in the range of 1.2 to 10. With such a configuration, the above-described effect is more satisfactorily obtained, in addition to which the effect as described below can be obtained. The blowing port 3 is required to have a certain width since it is necessary to warm the calf of the occupant. By contrast, the area of the opening of the intake port 2 is desirably small in order that air is efficiently drawn into the intake port 2 by increasing the flow velocity of the air in the vicinity of the intake port 2 in the flow path 4. With the ratio (W2/W1) being in the above range, it is possible to ensure both the warmth for the calf of the occupant and the efficient suction of air into the intake port 2.

In the usage state, as shown in FIG. 5, the normal line B to the opening face of the blowing port 3 is downwardly inclined at an angle (blowing angle) θ to the horizontal plane A. The blowing angle θ is not particularly limited as long as it is more than 0° and less than 90°. The blowing angle θ is, for example, in the range of 30° to 70°. With the blowing angle θ being in this range, warm air blown out through the blowing port 3 is highly likely to flow along the lower leg of the occupant and is also highly likely to reach the intake port 2. Therefore, both high probability of warm air reaching the intake port 2 and ensuring of warmth for the lower leg of the occupant are reliably achieved. In order to enhance this effect, the blowing angle θ is desirably in the range of 35° to 60°, and more desirably in the range of 40° to 50°.

As shown in FIG. 4, the flow path 4 has a narrowing flow path 4A having a flow path cross-sectional area that decreases from the upstream side to the downstream side in the flow direction of air. Specifically, the width of the narrowing flow path 4A in the back-and-forth direction (X-axis direction) of the heater-equipped vehicle seat 1 becomes smaller with decreasing distance to the blowing port 3. In addition, as shown in FIG. 2, the length of the housing in the width direction (Y-axis direction) becomes smaller with decreasing distance to the blowing port 3. Along with this, the length of the narrowing flow path 4A in the width direction also becomes smaller with decreasing distance to the blowing port 3. Therefore, the flow velocity of air flow is increased on the downstream side in the narrowing flow path 4A. As a result, warm air is blown out through the blowing port 3 at a high flow velocity; therefore, the warmth for the occupant can be increased.

The narrowing flow path 4A is formed downstream of the heater 7 in the flow direction of air. Therefore, warm air produced by heating by the heater 7 flows in the narrowing flow path 4A, due to which the flow velocity of the warm air is increased. With such a configuration, the flow velocity of air flowing in the heater 7 is lower than the flow velocity of air flowing in the downstream portion of the narrowing flow path 4A. Therefore, the air flowing in the heater 7 can be sufficiently heated by the heater 7.

The mounting structure 8 will be described. As shown in FIG. 5, the mounting structure 8 has an engaging portion 8A that engages with the support structure 15 fixed to the vehicle seat 11. That is, the heater-equipped vehicle seat 1 includes the support structure 13 that supports the vehicle heating apparatus 100A. Specifically, the support structure 13 has a rail 13C fixed to the vehicle seat 11 so as to extend in the width direction (Y-axis direction). The support structure 13 is fixed to the vehicle seat 11 by a jig 14. In the jig 14, for example, there are formed screw holes or the like used for fixing the support structure 13. The jig 14 is fixed to the vehicle seat 11 by rivets or the like. The engaging portion 8A is in engagement with the rail 13C in such a manner that the housing 10 is movable along the rail 13C in the width direction (Y-axis direction). Due to such a configuration, the position of the vehicle heating apparatus 100A in the width direction can be minutely adjusted. For example, the engaging portion 8A may be formed so as to extend continuously from one end to the other end in the width direction (Y-axis direction) of the housing 10. Alternatively, a plurality of engaging portions 8A may be arranged at intervals in the width direction (Y-axis direction) of the housing 10.

As shown in FIG. 4, the rail 13C has an upper end portion 13D, a lower end portion 13E, and a middle portion 13F. The upper end portion 13D extends in the upward direction (the positive direction of the Z axis) in the usage state. The lower end portion 13E extends in the downward direction (the negative direction of the Z axis) in the usage state. The engaging portion 8A is in engagement with the upper end portion 13D and the lower end portion 13E. In the engaging portion 8A is formed an engaging slit 8B for engaging with the rail 13C. The width of the engaging slit 8B (the width in the X-axis direction) is slightly greater than the thickness of the upper end portion 13D or the thickness of the lower end portion 13E. Therefore, the occupant can minutely move the housing 10 along the rail 13C in the width direction. Since the engaging portion 8A engages with both of the end portions of the rail 13C in the up-and-down direction (Z-axis direction) in the usage state, the posture of the housing is stable when the engaging portion 8A is in engagement with the rail 13A is stabilized. In addition, since an interval equal to or greater than a certain length is formed between the position where the engaging portion 8A engages with the upper end portion 13D and the position where the engaging portion 8A engages with the lower end portion 13E, the amount of backlash of the housing 10 in the back-and-forth direction (X-axis direction) of the heater-equipped vehicle seat 1 is reduced.

The middle portion 13F is spaced from the housing 10 in a region between the upper end portion 13D and the lower end portion 13E. For example, the rail 13C can be fixed to the vehicle seat 11 by inserting and tightening screws into through holes formed in the middle portion 13F and into screw holes of the jig 14. That is, the middle portion 13E can be used to fix the rail 13C to the vehicle seat 11.

As shown in FIG. 2, a pair of the vehicle heating apparatuses 100A are mounted on the vehicle seat 11 at a distance from each other in the width direction (Y-axis direction). Therefore, the occupant can adjust the position of one vehicle heating apparatus 100A in the width direction to the position of the left leg of the occupant, and can adjust the position of the other vehicle heating apparatus 100A in the width direction to the position of the right leg of the occupant. Consequently, the convenience for the occupant can be improved. When there is a gap formed between the lower part of the right leg of the occupant and the lower part of the left leg of the occupant, supply of the warm air toward the gap can be prevented.

The support structure 13 has a left support structure 13A (left rail) and a right support structure 13B (right rail) that are fixed to the vehicle seat 11 at a distance from each other in the width direction (Y-axis direction). The pair of vehicle heating apparatuses 100A are supported respectively by the left support structure 13A and by the right support structure 13B. With such a configuration, the space between the left support structure 13A and the right support structure 13B can be effectively used. A power supply unit (omitted from the drawings) that supplies electricity to the fan 6 and the heater 7, or a control unit (omitted from the drawings) that controls the number of revolutions of the fan 6 or the amount of heating by the heater 7, may be disposed outside the housing 10. For example, the space between the left support structure 13A and the right support structure 13B can be used to dispose the power supply unit or the control unit. When the power supply unit or the control unit is disposed below the vehicle seat 11, cables that make electrical connection between the power supply unit or the control unit and the fan 6 or the heater 7 can be laid out by using the space.

<Modification>

The vehicle heating apparatus 100A and the heater-equipped vehicle seat 1 of the present embodiment can be modified in various respects. The heater-equipped vehicle seat 1 may further include a locking mechanism that can be set to a locking position for restraining the movement of the housing 10 in the width direction (Y-axis direction) and to an unlocking position for permitting the movement of the housing 10 in the width direction (Y-axis direction). This locking mechanism is, for example, a latch that comes into contact with the housing 10 at the locking position. With such a feature, it is possible to prevent the housing 10 from being moved in the width direction (Y-axis direction) by, for example, an inertial force generated during travel of the vehicle.

Figure 7A:
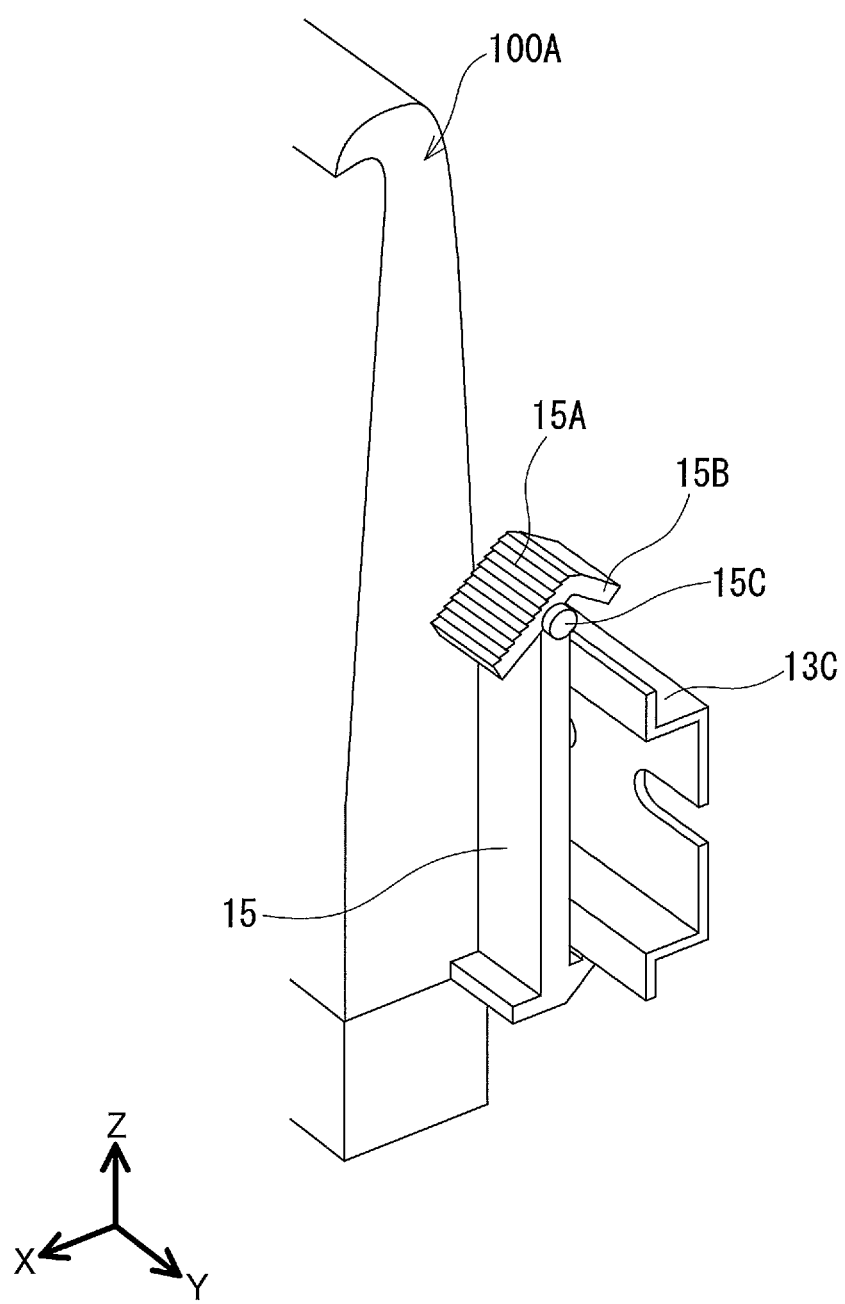
FIG. 7A is an enlarged view of a major portion of a locking mechanism of a vehicle heating apparatus according to a modification.
Figure 7B:
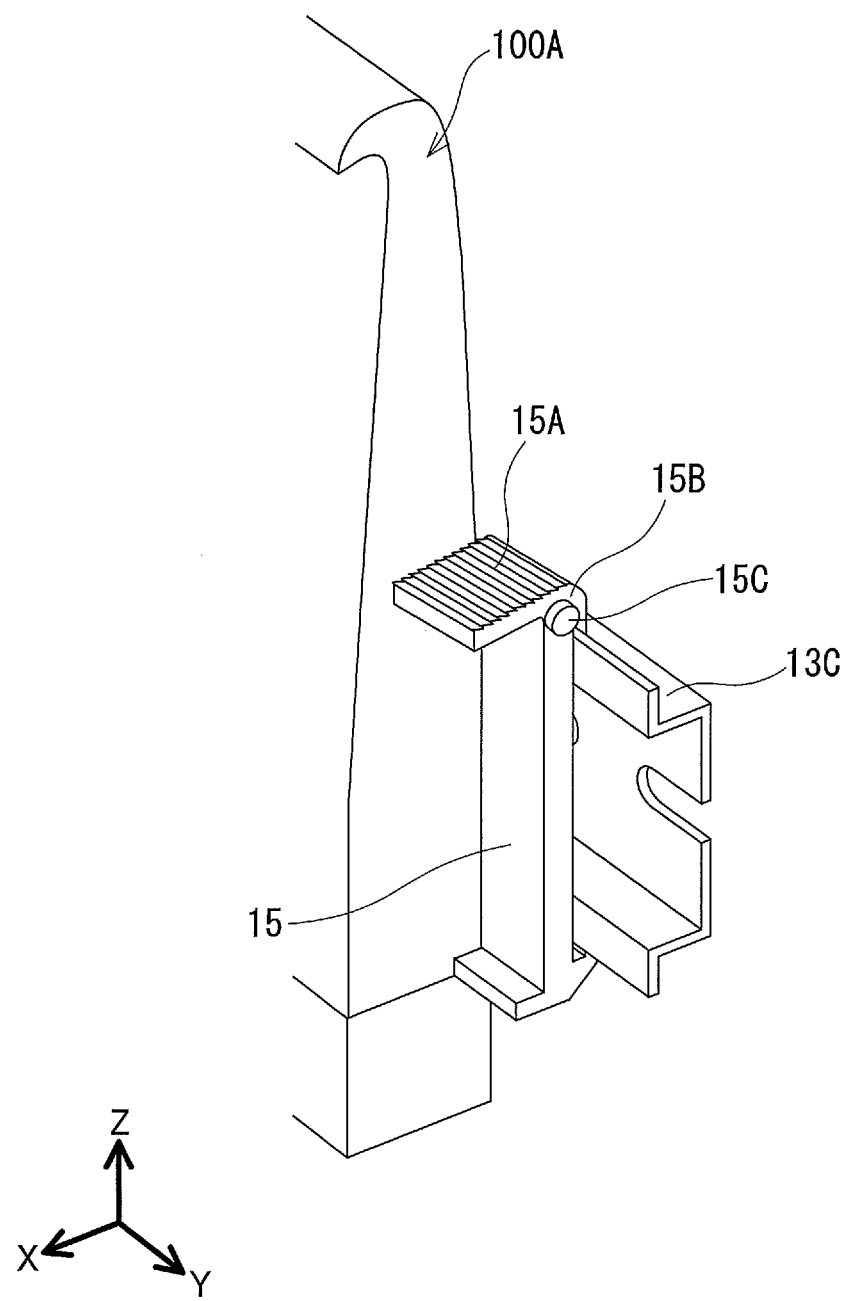
FIG. 7B is an enlarged view of a major portion of the vehicle heating apparatus in which the locking mechanism of FIG. 7A is in a locked state.

As shown in FIG. 7A and FIG. 7B, the vehicle heating apparatus 100A may further include a locking mechanism 15 provided at an end in the width direction (Y-axis direction) of the vehicle heating apparatus 100A. The locking mechanism 15 includes a lever 15A, a locking portion 15B, and a spring 15C. The lever 15A and the locking portion 15B are integrally formed as a plate bent in an L-shape. The spring 15C urges the L-shaped plate constituted by the lever 15A and the locking portion 15B so as to press the lever 15A in the upward direction (the positive direction of the Z axis). Thus, as shown in FIG. 7B, the locking portion 15B restrains the movement of the housing 10 in the width direction (Y-axis direction) by being in contact with the rail 13C.

The lever 15A is formed so as to disengage the locking portion 15B from the rail 13C. By the occupant pressing the lever 15A downwardly against the urging force of the spring 15C, the locking portion 15B is disengaged from the rail 13C as shown in FIG. 7A. Thus, the housing 10 of the vehicle heating apparatus 100A is made movable along the rail 13C in the width direction (Y-axis direction). When the fingers of the occupant are released from the lever 15A, the L-shaped plate is pivoted by the urging force of the spring 15C until the locking portion 15B comes into contact with the rail 13C. With such a feature, after adjustment of the position of the housing 10 of the vehicle heating apparatus 100A in the width direction (Y-axis direction), the movement of the housing 10 in the width direction (Y-axis direction) can be restrained. Therefore, it is possible to prevent the housing 10 from being moved in the width direction (Y-axis direction) by, for example, an inertial force generated during travel of the vehicle.

The support structure 13 may be in the form of a plurality of hooks fixed to the vehicle seat 11 at predetermined intervals in the width direction (Y-axis direction), and the engaging portion 8A may be configured to engage with at least one (preferably two or more) of the hooks. In this case, there may be formed an engaging hole for engaging with the hook in the engaging portion 8A, and the engaging portion 8A may be attachable to and detachable from the hook. The plurality of hooks may be arranged in a line in the width direction. With such a feature, the support structure 13 can be simplified.

The engaging portion 8A may be configured to be attachable to and detachable from the support structure 13. For example, the engaging portion 8A may engage only with the upper end portion 13D of the rail 13C. With such a feature, the vehicle heating apparatus 100A can easily be removed from the vehicle seat 11 for maintenance or the like.

The heater-equipped vehicle seat 1 may be configured so that the position of the vehicle heating apparatus 100A (specifically the housing 10) can be adjusted continuously or stepwise in the width direction. Furthermore, the heater-equipped vehicle seat 1 may be configured so that the vehicle heating apparatus 100A can occupy only two positions in the width direction. Specifically, the number of positions where the vehicle heating apparatus 100A can be fixed may be only two. Even such a configuration can respond satisfactorily to a situation where the occupant sits on the seat with his/her legs apart and a situation where the occupant sits on the seat with his/her legs close together.

The support structure 13 may be configured to extend continuously from one end to the other end of the vehicle seat 11 in the width direction (Y-axis direction). In this case, the range of motion of the vehicle heating apparatus 100A in the width direction can be set wide.

A single vehicle heating apparatus 100A or a plurality of vehicle heating apparatuses 100A may be mounted on the vehicle seat 11.

The heater 7 may be located closer to the intake port 2 than the fan 6. With such a feature, the flow velocity of warm air blown out through the blowing port 3 can be increased due to the relatively short distance between the fan 6 and the blowing port 3. As a result, the circulation of warm air between the blowing port 3 and the intake port 2 is promoted.

When a pair of the vehicle heating apparatuses 100A are mounted on the vehicle seat 11, there may be a difference between the temperature of warm air blown out through the blowing port 3 of one vehicle heating apparatus 100A and the temperature of warm air blown out through the blowing port 3 of the other vehicle heating apparatus 100A. That is, the amount of heating by the heater 7 of one vehicle heating apparatus 100A may be larger than the amount of heating by the heater 7 of the other vehicle heating apparatus 100A. With such a feature, for example, warm air having a higher temperature can be blown out through the blowing port 3 of one of the pair of vehicle heating apparatuses 100A that is provided closer to a window of the vehicle. Therefore, it is possible to reduce the influence of radiation of cool air from the window of the vehicle and thereby to achieve sensory balance of the warmth for the occupant.

Figure 8:
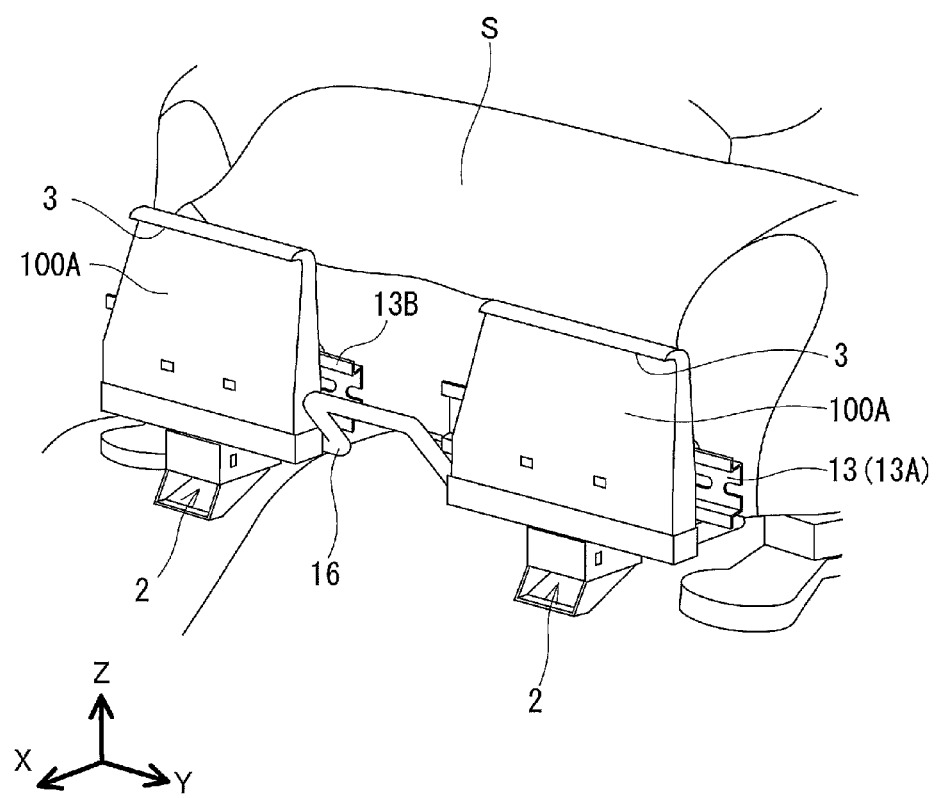
FIG. 8 is an enlarged view of a major portion of a heater-equipped vehicle seat according to another modification.

As shown in FIG. 8, the heater-equipped vehicle seat 1 may further include a seat position adjustment bar 16 provided between the left support structure 13A and the right support structure 13B and operative to adjust the position of the vehicle seat 11 in the back-and-forth direction (X-axis direction). Depending on its position, the seat position adjustment bar 16 can be in two states, a restraining state and a releasing state. When the seat position adjustment bar 16 is in the restraining state, the relative movement between the vehicle seat 11 and the base member 12 is restrained by a locking mechanism (omitted from the figure) coupled to the seat position adjustment bar 16. When, for example, the seat position adjustment bar 16 is tilted by the occupant in the upward direction (the positive direction of the Z axis) of the vehicle seat 11, the state of the seat position adjustment bar 16 changes from the restraining state to the releasing state. When the seat position adjustment bar 16 is in the releasing state, the lock by the locking mechanism (omitted from the figure) coupled to the seat position adjustment bar 16 is released, and the relative movement between the vehicle seat 11 and the base member 12 is enabled. Thus, the occupant can adjust the position of the vehicle seat 11 in the back-and-forth direction (X-axis direction). With such a configuration, the occupant can easily adjust the position of the vehicle seat 11 in the back-and-forth direction. In addition, the seat position adjustment bar can be provided by using the space between the left support structure and the right support structure. Since the parts operated by the occupant for the adjustment of the position of the vehicle heating apparatus 100A and the adjustment of the position of the vehicle seat 11 are closely located, the convenience for the occupant is improved.

<Second Embodiment>

A vehicle heating apparatus 100B of a second embodiment of the present disclosure will be described. Unless otherwise described, the second embodiment is configured in the same manner as the first embodiment. The components of the second embodiment that are the same as or correspond to those of the first embodiment are denoted by the same reference characters as used in the first embodiment, and the detailed description of the components are omitted in some cases. That is, the descriptions given for the first embodiment and the modifications of the first embodiment can apply to the present embodiment unless technically inconsistent. This also holds true for the embodiment described later.

Figure 9:
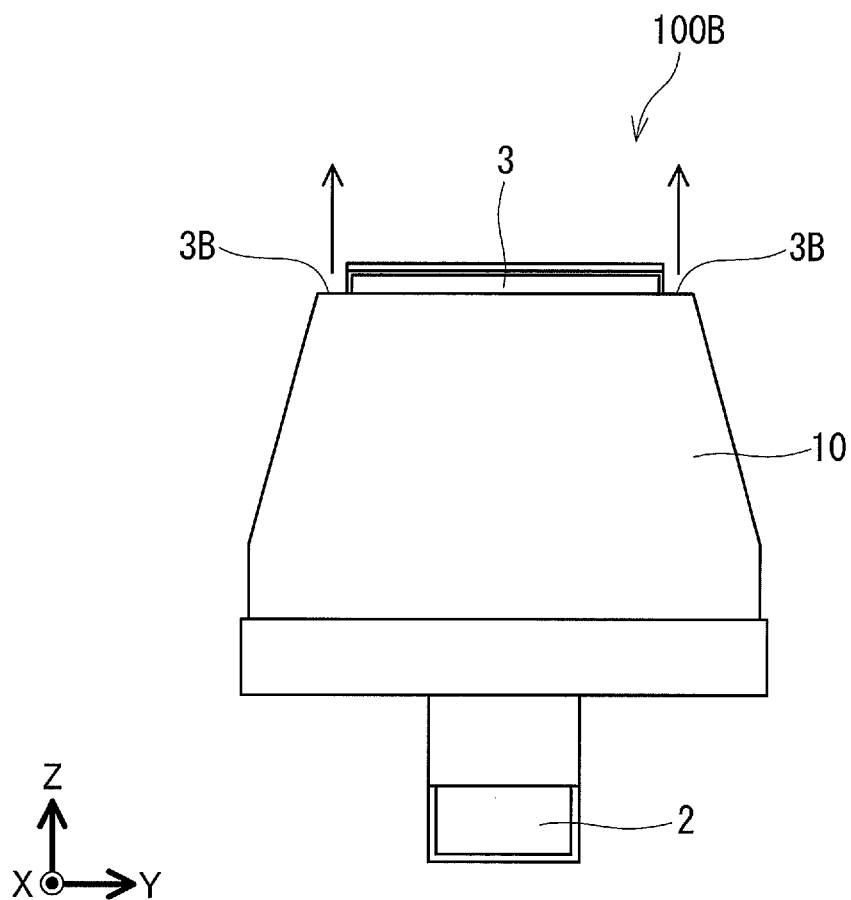
FIG. 9 is a front view of a vehicle heating apparatus according to a second embodiment.

As shown in FIG. 9, upward blowing ports 3B are formed in the housing 10 of the vehicle heating apparatus 100B. The upward blowing ports 3B are openings formed so as to blow warm air upwardly in the usage state. The upward blowing ports 3B are formed at positions adjacent respectively to one end of the blowing port 3 in the width direction (Y-axis direction) and to the other end of the blowing port 3 in the width direction. That is, the pair of upward blowing ports 3B open at both ends in the width direction of the housing 10. Therefore, as shown in FIG. 9, warm air is not only blown out through the blowing port 3 but is also blown out through the upward blowing ports 3B upwardly. Accordingly, warm air can be supplied so as to encompass the upper legs of the occupant, due to which the warmth for the occupant can be increased.

<Third Embodiment>

Figure 10:
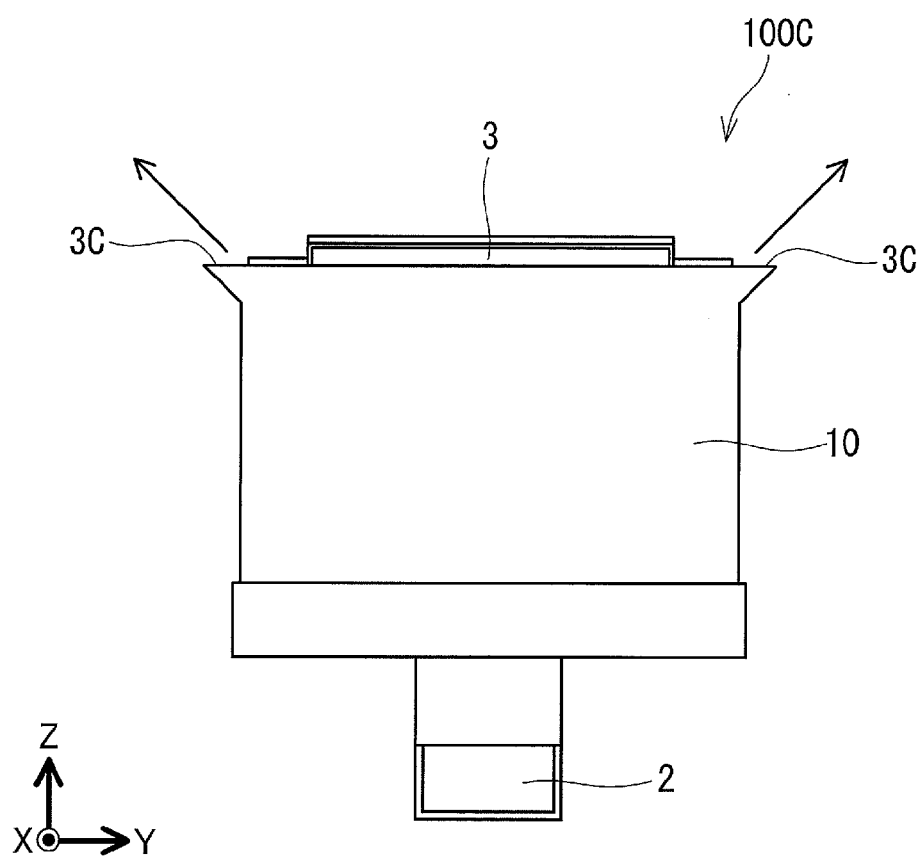
FIG. 10 is a front view of a vehicle heating apparatus according to a third embodiment.

A vehicle heating apparatus 100C of a third embodiment of the present disclosure will be described. As shown in FIG. 10, oblique blowing ports 3C are formed in the housing 10. The oblique blowing ports 3C are formed so as to blow warm air obliquely upward in the usage state. Specifically, the oblique blowing ports 3C are formed so as to blow warm air upwardly of the housing 10 in a direction (an obliquely upward direction) inclined relative to the Z-axis direction and the Y-axis direction. The oblique blowing ports 3C are formed at positions adjacent respectively to one end of the blowing port 3 in the width direction (Y-axis direction) and the other end of the blowing port 3 in the width direction. That is, the pair of oblique blowing ports 3C open at both ends in the width direction of the housing 10. Therefore, as shown in FIG. 10, warm air is not only blown out through the blowing port 3 but is also blown out obliquely upward.

It is often the case that the vehicle seat 11 is located adjacent to a window of the vehicle that separates the indoor space of the vehicle from the outside atmosphere. Therefore, cool air may be radiated from the window of the vehicle toward the occupant. In this case, warm air can be blown out obliquely upward toward the window of the vehicle through the oblique blowing ports 3C of the vehicle heating apparatus 100C. Therefore, the influence of radiation of cool air from the window of the vehicle is reduced, due to which the warmth for the occupant can be increased. The oblique blowing port 3C may be provided only at that one of the two ends in the width direction of the upper end portion of the housing 10 which is closer to the window of the vehicle.

<Another Modification>

Figure 11:
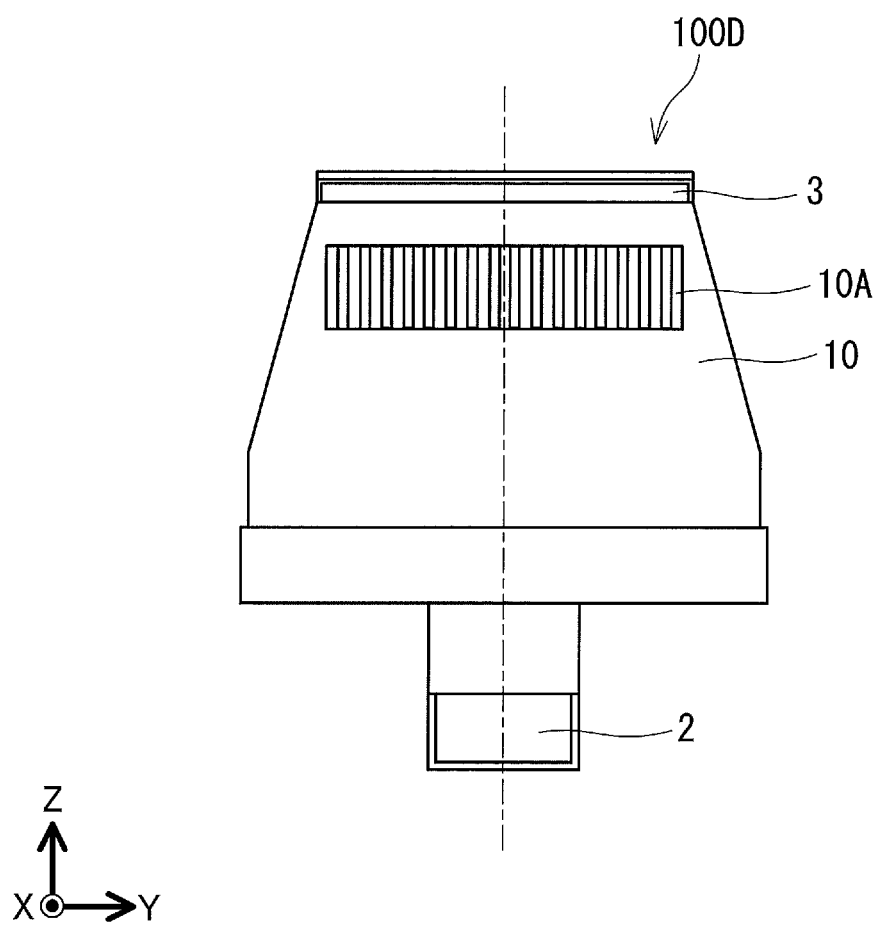
FIG. 11 is a front view of a vehicle heating apparatus according to still another modification.
Figure 12:
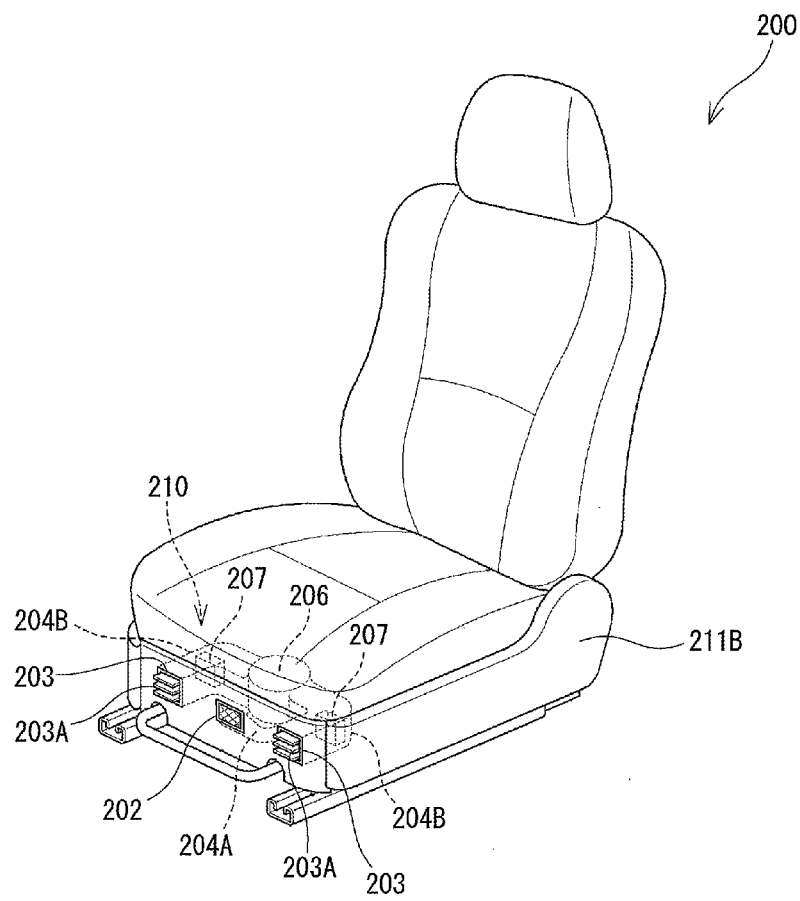
FIG. 12 is a perspective view of a conventional heater-equipped vehicle seat.
Figure 13:
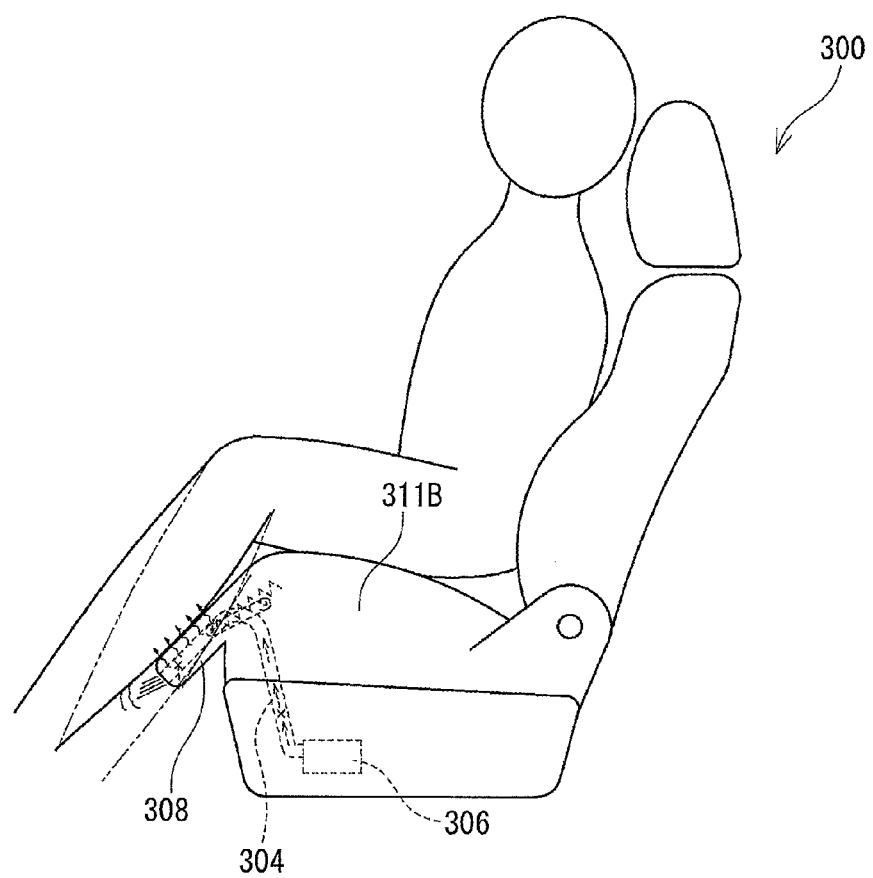
FIG. 13 is a side view of another conventional heater-equipped vehicle seat.

As shown in FIG. 11, a vehicle heating apparatus 100D may include a radiation member 10A on the front surface of the housing 10. The radiation member 10A exchanges heat with warm air present between the heater 7 and the blowing port 3, and radiates heat outwardly. In the usage state, the radiation member 10A radiates heat forward. The radiation member 10A is a metal plate made of aluminum, iron, or the like. In order to ensure a large radiation area, projections and depressions are formed in the front face of the radiation member 10A. The back face of the radiation member 10A is in contact with the housing 10, and is thus heated by warm air present between the heater 7 and the blowing port 3. An opening appropriate for the size of the radiation member 10A may be formed in the front face of the housing 10, and the radiation member 10A may be attached in such a manner as to close the opening. In this case, the back face of the radiation member 10A forms a portion of the flow path 4. With such a feature, heat can be radiated forward by the radiation member 10A; therefore, the warmth for the occupant can be increased.

In the vehicle heating apparatus 100D, a plate-shaped electric heater (omitted from the figure) such as a PTC heater or a ceramic heater may be attached to the front face of the housing 10 in place of the radiation member 10A or in addition to the radiation member 10A. Also with such a feature, the warmth for the occupant can be increased.

The pair of vehicle heating apparatuses mounted on the vehicle seat 11 at a distance from each other in the width direction (Y-axis direction) may be constituted by an arbitrary combination of the vehicle heating apparatuses 100A to 100D described above. In this case, in order to reduce the influence of the radiation of cool air from a window of the vehicle, it is recommended to use the vehicle heating apparatus 100C as that one of the pair of vehicle heating apparatuses which is closer to the window of the vehicle.

The postures of the vehicle heating apparatuses 100A to 100D in the usage state are not limited to those assumed by the vehicle heating apparatuses 100A to 100D in the case where the XY plane is horizontal in the accompanying drawings. The postures of the vehicle heating apparatuses 100A to 100D in the usage state may be those assumed by the vehicle heating apparatuses 100A to 100D in the case where the XY plane in the accompanying drawings is inclined at an angle of, for example, 5° or less to the horizontal plane.

INDUSTRIAL APPLICABILITY

The vehicle heating apparatuses disclosed in the present description can be applied to seats of vehicles such as automobiles, electric trains, airplanes, and ships.

The invention claimed is:

1. A vehicle heating apparatus to be mounted on a vehicle seat at a position below a sitting portion of the vehicle seat, the vehicle heating apparatus comprising:
    a housing having an intake port, a blowing port, and an internal space serving as a flow path of air from the intake port to the blowing port;
    a fan provided in the internal space;
    a heater provided in the internal space; and
    a mounting structure adapted to mount the housing to the vehicle seat in such a manner that the housing is movable in a width direction of the vehicle seat,
    wherein the mounting structure has an engaging portion that engages with a support structure fixed to the vehicle seat,
    the support structure has a rail fixed to the vehicle seat so as to extend in the width direction, and
    the engaging portion engages with the rail in such a manner that the housing is movable along the rail in the width direction.

2. The vehicle heating apparatus according to claim 1, wherein, in a usage state where the vehicle heating apparatus is mounted on the vehicle seat, the blowing port is located above the intake port and opens downwardly relative to a horizontal direction.

3. The vehicle heating apparatus according to claim 1, wherein the flow path of air has a narrowing flow path having a flow path cross-sectional area that decreases from an upstream side toward a downstream side in a flow direction of air.

4. The vehicle heating apparatus according to claim 1, wherein, in a usage state where the vehicle heating apparatus is mounted on the vehicle seat, the engaging portion engages with an upper end portion of the rail and a lower end portion of the rail.

5. The vehicle heating apparatus according to claim 1, further comprising a locking mechanism provided at an end in a width direction of the housing, wherein
    the locking mechanism comprises:
        a locking portion that restrains movement of the housing in the width direction of the vehicle seat by being in contact with the rail in a usage state where the vehicle heating apparatus is mounted on the vehicle seat; and
        a lever operative to disengage the locking portion from the rail.

6. A heater-equipped vehicle seat comprising:
    a vehicle seat having a sitting portion; and
    the vehicle heating apparatus according to claim 1 mounted on the vehicle seat at a position below the sitting portion,
    wherein the support structure fixed to the vehicle seat supports the vehicle heating apparatus.

7. The heater-equipped vehicle seat according to claim 6, wherein a pair of the vehicle heating apparatuses are mounted on the vehicle seat at a distance from each other in the width direction.

8. The heater-equipped vehicle seat according to claim 6, wherein
    the support structure has a left support structure and a right support structure that are fixed to the vehicle seat at a distance from each other in the width direction, and
    the pair of vehicle heating apparatuses are supported respectively by the left support structure and by the right support structure.

9. The heater-equipped vehicle seat according to claim 8, further comprising a seat position adjustment bar provided between the left support structure and the right support structure and operative to adjust a position of the vehicle seat in a back-and-forth direction.

10. The heater-equipped vehicle seat according to claim 6, wherein the engaging portion is in engagement with an upper end portion of the rail and a lower end portion of the rail.

11. The heater-equipped vehicle seat according to claim 10, wherein the rail has a middle portion spaced from the housing in a region between the upper end portion and the lower end portion.

* * * * *